US008545192B2

(12) United States Patent
Tsuboi

(10) Patent No.: US 8,545,192 B2
(45) Date of Patent: Oct. 1, 2013

(54) DIESEL PUMP WITH CYLINDER AND OUTLET JOINT ARRANGEMENT

(75) Inventor: Masaharu Tsuboi, Sayama (JP)

(73) Assignee: Koganei Seiki Co., Ltd., Saitama (JP)

( * ) Notice: Subject to any disclaimer, the term of this patent is extended or adjusted under 35 U.S.C. 154(b) by 258 days.

(21) Appl. No.: 12/991,919

(22) PCT Filed: May 11, 2009

(86) PCT No.: PCT/JP2009/002051

§ 371 (c)(1), (2), (4) Date: Jan. 17, 2011

(87) PCT Pub. No.: WO2009/139145

PCT Pub. Date: Nov. 19, 2009

(65) Prior Publication Data

US 2011/0142689 A1 Jun. 16, 2011

(30) Foreign Application Priority Data

May 14, 2008 (JP) ................................ 2008-127407

(51) Int. Cl.
*F04B 1/00* (2006.01)
*F16J 10/02* (2006.01)

(52) U.S. Cl.
USPC ......... 417/273; 29/888.02; 92/163; 92/171.1; 417/53

(58) Field of Classification Search
USPC ................ 417/273, 53; 123/495; 29/888.02, 29/888.022, 888.023, 888.024, 888.025, 29/525, 525.11, 456; 92/163, 171.1
See application file for complete search history.

(56) References Cited

U.S. PATENT DOCUMENTS

| | | | | |
|---|---|---|---|---|
| 4,339,234 | A * | 7/1982 | Williams | 417/490 |
| 4,952,121 | A * | 8/1990 | De Matthaeis et al. | 417/273 |
| 4,968,220 | A * | 11/1990 | Filippi et al. | 417/273 |
| 6,289,875 | B1 * | 9/2001 | Shinohara et al. | 123/450 |
| 6,345,609 | B1 * | 2/2002 | Djordjevic | 123/509 |
| 6,350,107 | B1 | 2/2002 | Hamutcu | |
| 6,698,399 | B1 | 3/2004 | Grabert | |
| 7,296,980 | B2 * | 11/2007 | Olivieri et al. | 417/273 |

(Continued)

FOREIGN PATENT DOCUMENTS

| | | | |
|---|---|---|---|
| DE | 10223730 | A1 | 2/2003 |
| EP | 881380 | A1 * | 12/1998 |
| JP | 11-230005 | A | 8/1999 |

(Continued)

OTHER PUBLICATIONS

English Abstract of EP0881380A1 from Feb. 12, 1998.*

*Primary Examiner* — Devon Kramer
*Assistant Examiner* — Nathan Zollinger
(74) *Attorney, Agent, or Firm* — Hammer & Associates, P.C.

(57) ABSTRACT

A diesel pump having enhanced durability in a high pressure environment, capable of being produced at high productivity, and at low cost. The diesel pump is provided with a cylinder formed in a pump housing, a plunger reciprocatably provided in the cylinder, and a drive mechanism for driving the plunger. The cylinder is a separate part from the pump housing and is mounted in the pump housing. The cylinder consists of sulfurless alloy steel, is a tubular part and may be press-fitted in the pump housing. The front end of an outlet joint reaches the cylinder, and a fuel discharge route directly connects to the outlet joint from the cylinder without passing through the pump housing.

20 Claims, 8 Drawing Sheets

(56) References Cited

U.S. PATENT DOCUMENTS

| | | | | |
|---|---|---|---|---|
| 2002/0192092 | A1 | 12/2002 | Mori | |
| 2003/0228230 | A1 | 12/2003 | Nagai | |
| 2004/0052664 | A1* | 3/2004 | Saito et al. | 417/490 |
| 2005/0079082 | A1 | 4/2005 | Olivieri et al. | |
| 2006/0236977 | A1* | 10/2006 | Denton et al. | 123/456 |

FOREIGN PATENT DOCUMENTS

| | | | |
|---|---|---|---|
| JP | 4288000 | B2 | 2/2002 |
| JP | 2002-510015 | A | 4/2002 |
| JP | 2003-049745 | | 2/2003 |
| JP | 2006-118448 | | 5/2006 |
| JP | 3904712 | B2 | 1/2007 |

* cited by examiner

DIESEL PUMP WITH CYLINDER AND OUTLET JOINT ARRANGEMENT

RELATED APPLICATION

The present application claims benefits related to Japanese Patent Application 2008-127407 filed in Japan on May 14, 2008 and the contents of the application are to be incorporated herein by reference.

TECHNICAL FIELD

The present invention relates to a diesel pump which supplies fuel of high pressure to a diesel engine, and in particular, relates to a technology to provide a diesel pump having high reliability at low cost.

BACKGROUND ART

A diesel engine is provided with a diesel pump to supply fuel of high pressure. Conventionally, one diesel pump has been provided to each cylinder of the engine. However, recently, a common rail system is becoming popular in order to meet requirements for higher pressure. The common rail system is configured to supply fuel to plural cylinders from a diesel pump via a common rail.

Conventionally, fuel pressure for a commercial diesel engine has been equal to or lower than 1,000 bar (i.e., 100 MPa). In this case, a diesel pump of an inner plunger type has been popularly used. With this type of diesel pump, fuel is pressurized by driving a plunger toward the pump center.

Meanwhile, for a diesel engine for a recent passenger car, the fuel pressure is equal to or higher than 1400 bar (i.e., 140 MPa) as reaching 2,000 bar (i.e., 200 MPa). The fuel pressure is expected to be further increased. For such a diesel engine, a diesel pump of an outer plunger type is adopted. In this case, plural plungers are radially arranged and fuel is pressurized as the plungers are pressed outward. In general, the number of the plungers is two or three.

A diesel pump of a conventional outer plunger type has been disclosed in Japanese Patent Laid-open 2003-49745, for example. In the document, a housing has a divided structure constituted with a housing main body and a cylinder head. The housing main body is made of aluminum and the cylinder head is made of steel. The cylinder head is fastened with bolts to the housing main body. Cylinder portion forms a single body with the cylinder head. The cylinder portion is protruded toward the housing main body and is located within an opening of the housing main body. A plunger is inserted into the cylinder portion and the plunger is driven by a drive mechanism of the housing main body.

When the plunger reciprocates within the cylinder as being driven by the drive mechanism, high pressure is repeatedly applied to the cylinder. In order to obtain sufficient durability for high pressure of fuel, the conventional diesel pump has the cylinder head made of steel as described above.

Here, in the conventional diesel pump, there may be a case that segregation of a trace ingredient of sulfur and the like for cylinder material appears at the inner face of the cylinder. Such segregation could become a crack source causing reduced durability of the diesel pump. Since the segregation appears in random manner, it is difficult to totally get rid of segregation at a machined surface of the cylinder.

Particularly, the fuel pressure is increasing recently, and is reaching 2,000 bar (i.e., 200 MPa) as described above. Decrease in durability due to the segregation becomes a problem in order to manufacture a diesel pump for such a high pressure in which very high reliability is expected.

One way to avoid disadvantages caused by such segregation is to use special alloy steel containing less amount of impurity, such as sulfur. However, such special alloy steel is expensive and is poor in machinability. A conventional cylinder head is large in size and has many areas to be machined. Therefore, in the case that special alloy steel as described above is utilized for the cylinder head, productivity is lost and manufacturing cost is seriously increased.

DISCLOSURE OF THE INVENTION

Problems to be Solved by the Invention

The present invention achieved under the above circumstances, and its object is to provide a diesel pump of which durability in a high pressure environment can be enhanced with high productivity and low cost.

Means to solve the Problems

A diesel pump of the present invention includes a pump housing; a cylinder arranged at the pump housing; a plunger reciprocably arranged at the cylinder; and a drive mechanism for driving the plunger; wherein the cylinder is a separate component from the pump housing and is attached to the pump housing.

As described above, since the cylinder is a separate component from the pump housing and is attached to the pump housing, the cylinder size can be decreased. Since the cylinder is small, material having high reliability can be easily adopted. More specifically, even if expensive and poor-machinability material having high reliability is adopted, it is possible to prevent serious decrease in productivity and serious increase in cost. Accordingly, it is possible to provide a diesel pump capable of enhancing durability in a high pressure environment with higher productivity and lower cost.

The cylinder may be made of sulfur-less alloy steel. In the specification and claims, the sulfur-less alloy steel denotes special alloy steel called sulfur-less generally utilized for an ultrahigh pressure component, that is, alloy steel containing an ingredient having high possibility of segregation, such as sulfur, as less as possible (hereinafter, same as the above). The cylinder may be a tubular component and may be press-fitted to the pump housing. Several cylinders may be radially arranged having the drive mechanism at the center and plungers may be arranged respectively to the cylinders. The drive mechanism may pressurize fuel by driving the plungers in the outer direction of the pump housing.

The plunger may include a plunger shaft inserted into the cylinder and a plunger flange portion to be pressed by the drive mechanism. The cylinder may be arranged in a range corresponding to the plunger shaft when the plunger shaft pressurizes fuel as the plunger flange portion is pressed by the drive mechanism. An inlet valve may be arranged at an end part in the axial direction of the cylinder and the cylinder may be arranged in a range not to exceed the inlet valve in the axial direction.

The diesel pump may include an outlet joint attached to the pump housing to discharge fuel from the cylinder and the front end of the outlet joint may reach the cylinder. A fuel discharge route is directly led from the cylinder to the outlet joint not via the pump housing.

The outlet joint may include a thread portion at the outer circumference and may be fastened to the pump housing. The front end of the outlet joint may be pressed to the cylinder with a fastening load.

The cylinder may include a joint contact area at the outer circumference. The joint contact area may be flat and the front end of the outlet joint may be contacting the joint contact area of the cylinder.

A fuel supply route to the cylinder is arranged so as to guide fuel to the cylinder passing through a cylinder end space formed at an end face part in the axial direction of the cylinder. The diesel pump may include structure where fuel leaked from a contact portion of the cylinder and the front end of the outlet joint is returned to the cylinder end space passing between the pump housing and the cylinder.

The cylinder may be press-fitted to a holding hole formed at the pump housing, and the holding hole may be plugged by a plug member at a position being apart from an end face in the axial direction of the cylinder. A cylinder end space may be formed by the end face in the axial direction of the cylinder, an inner face of the holding hole and the plug member. The cylinder end space may constitute a part of a fuel supply route to the cylinder. The cylinder may include a joint contact area at the outer circumference, and the front end of the outlet joint may be located at the joint contact area of the cylinder. A gap may be formed at a circumference of a contact portion of the cylinder and the outlet joint between the inner face of the holding hole and the joint contact area. The gap may be connected to the cylinder end space.

A cylinder step in the direction intersecting the axial direction may be formed at the cylinder and a housing step may be formed at the holding hole of the pump housing so as to be engaged with the cylinder step. The cylinder may be press-fitted to the holding hole from the outside and the cylinder step may contact against the housing step. The end in the cylinder axial direction of the gap may be defined by the housing step while positioning of the cylinder in the axial direction is performed by the contact.

The cylinder may include a first portion at the outer side in the axial direction from the cylinder step and a second portion at the inner side in the axial direction from the cylinder step. The first portion and the second portion may be integrated. The first portion may be press-fitted to the holding hole and the diameter of the second portion may be smaller than the diameter of the first portion. A spring gap may be formed between the second portion and the holding hole. A plunger spring may be arranged in the spring gap and may restore the plunger inward in the axial direction as being supported by the cylinder step. Here, the outer side is the side being closer to the outer face of the pump and the inner side is the side being closer to the center of the pump (i.e., the side being farther from the outer face of the pump).

The cylinder may have divided structure constituted with a slide portion to provide a cylinder function with which the plunger slides at the inside, and an inlet/outlet portion to provide a fuel sucking/discharging function having a pressurizing room and a fuel discharge hole. The inlet/outlet portion may be arranged at the outer side from the slide portion in the axial direction of the cylinder.

Another aspect of the present invention is a method for manufacturing a diesel pump. The method includes the processes of preparing a pump housing having a cylinder hold portion, attaching a cylinder being separate from the pump housing to the cylinder hold portion, reciprocably arranging a plunger to the cylinder, and attaching a drive mechanism for driving the plunger to the pump housing.

The cylinder may be made of sulfur-less alloy steel. The process of attaching the cylinder may include press-fitting the cylinder, which is tubular, to a holding hole arranged at the cylinder hold portion of the pump housing.

The method of the present invention may include the process of attaching an outlet joint for discharging fuel from the cylinder to the pump housing so that the front end of the outlet joint reaches the cylinder. A fuel discharge route may be led from the cylinder directly to the outlet joint not via the pump housing.

The process of attaching the outlet joint may include fastening the outlet joint to the pump housing by utilizing a thread portion at the outer circumference of the outlet joint, and pressing the front end of the outlet joint to the cylinder with the fastening load.

In the process of attaching the cylinder, the cylinder may be press-fitted to a holding hole formed at the pump housing. Further, according to the present invention, the holding hole may be plugged with the plug member at a position apart from an end face in the axial direction of the cylinder. A cylinder end space may be formed by the end face in the axial direction of the cylinder, an inner face of the holding hole, and the plug member. The cylinder end space may constitute a part of a fuel supply route to the cylinder. In the process of attaching the outlet joint, the front end of the outlet joint may be located at a joint contact area arranged at the outer circumference of the cylinder. A gap may be formed at the circumference of a contact portion of the cylinder and the outlet joint between the inner face of the holding hole and the joint contact area. Accordingly, the gap may be connected to the cylinder end space.

A cylinder step in the direction intersecting the axial direction may be formed in the cylinder. A housing step may be formed at the holding hole of the pump housing so as to be engaged with the cylinder step. The process of attaching the cylinder may include press-fitting the cylinder to the holding hole from the outside, contacting the housing step with the cylinder step, and forming the end in the cylinder axial direction of the gap with the housing step while performing positioning of the cylinder in the axial direction by the contact.

The cylinder may include a first portion at the outer side in the axial direction from the cylinder step and a second portion at the inner side in the axial direction from the cylinder step; the first portion and the second portion may be integrated; the first portion may be press-fitted to the holding hole; the diameter of the second portion may be smaller than the diameter of the first portion. The process of attaching the cylinder may form a spring gap between the second portion and the holding hole. Further, the present invention may have a plunger spring arranged at the spring gap, the spring supported by the cylinder step, and the plunger oriented inward in the axial direction.

The cylinder may have divided structure constituted with a slide portion to provide a cylinder function with which the plunger slides at the inside and an inlet/outlet portion to provide a fuel charging/discharging function having a pressurizing room and a fuel discharge hole. The process of attaching the cylinder may include inserting the slide portion into a holding hole formed at the housing hold portion of the pump housing. The inlet/outlet portion may be arranged at the outer side from the slide portion in the axial direction of the cylinder, and the inlet/outlet portion may be press-fitted to the holding hole from the outside.

EFFECTS OF THE INVENTION

As described above, the present invention can provide a diesel pump of which durability in a high pressure environment can be enhanced with high productivity and low cost.

As described in the following, different embodiments exist in the present invention. Accordingly, the disclosure of the invention is intended to provide a part of various embodiments according to the present invention and is not intended to limit the scope of the invention described as claims.

EMBODIMENTS OF THE INVENTION

In the following, the present invention will be described in detail. The following detailed description and the attached drawings are not to limit the invention. Alternately, the scope of the invention is defined by the attached claims.

Figure 1:
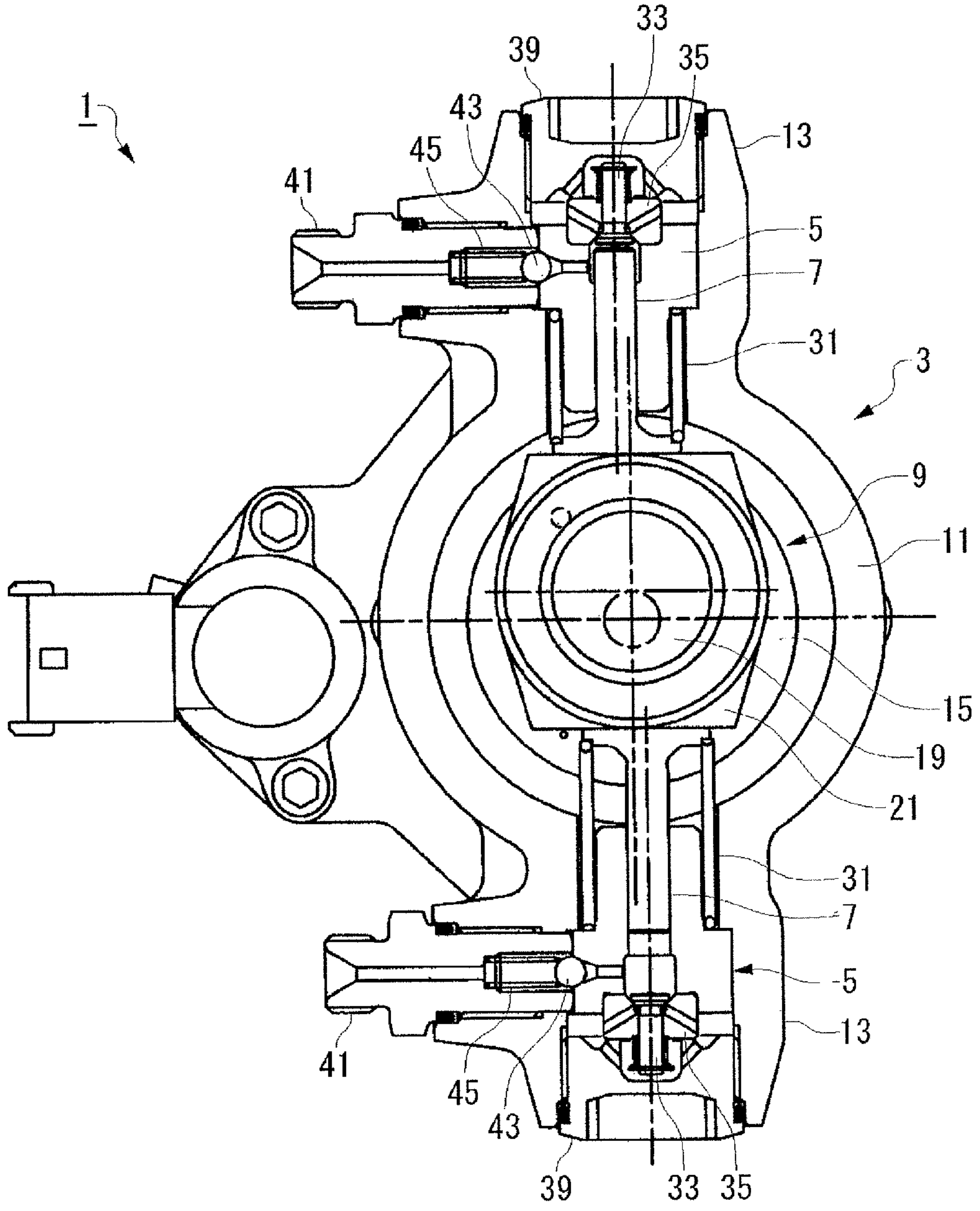
FIG. 1 is a sectional view of a diesel pump according to an embodiment of the present invention.
Figure 2:
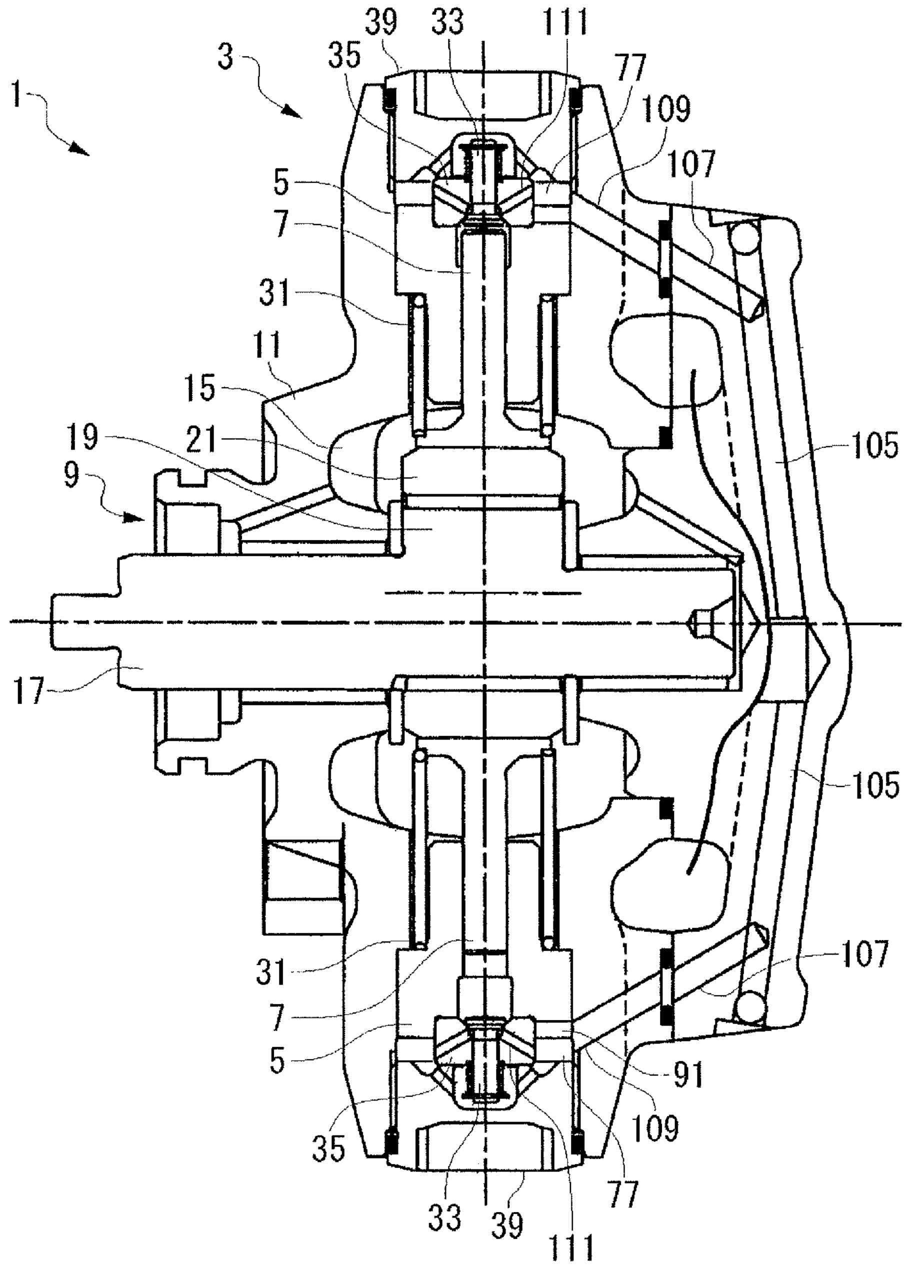
FIG. 2 is a sectional view of the diesel pump according to the embodiment of the present invention.
Figure 3:
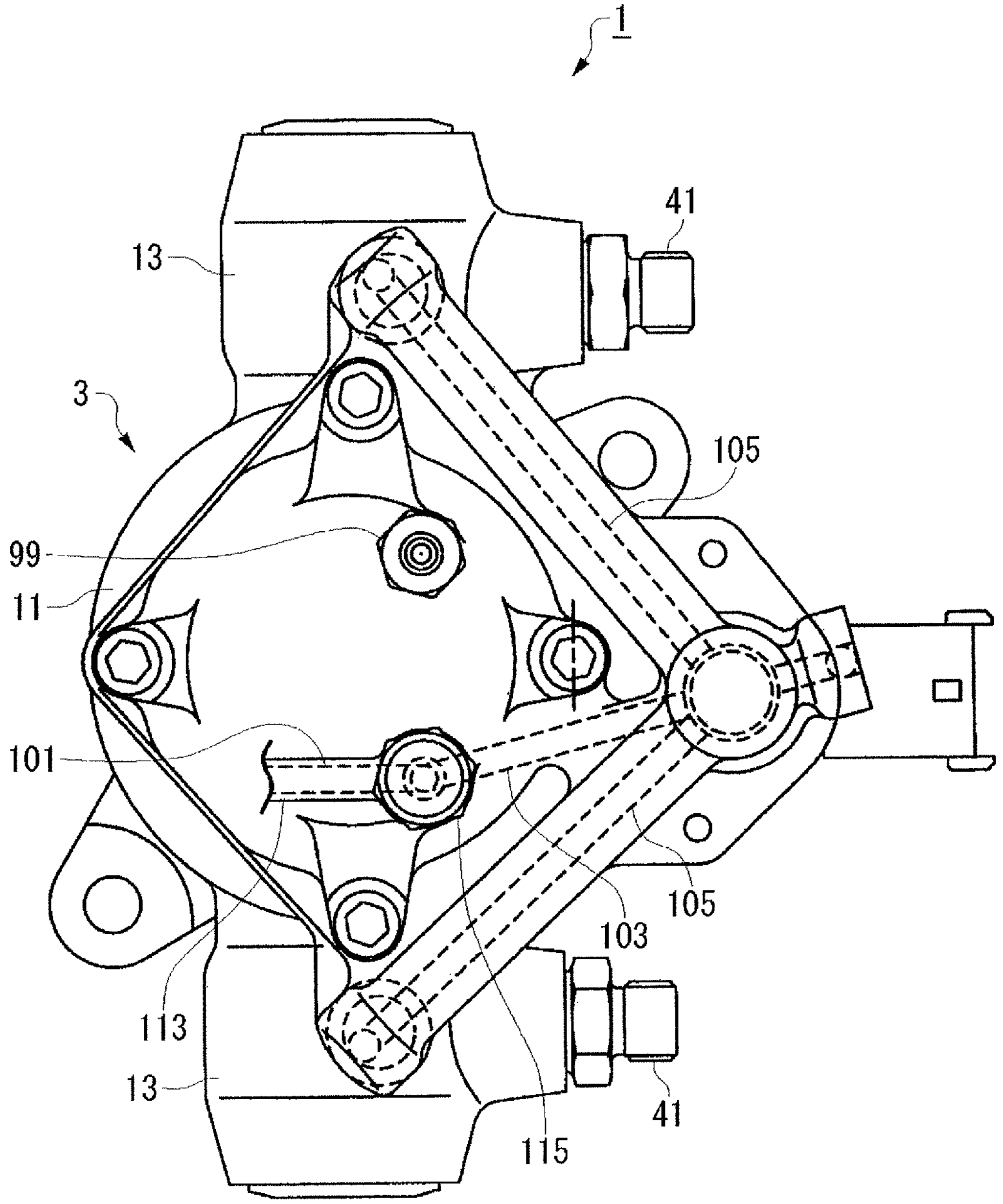
FIG. 3 is an external view of the diesel pump according to the embodiment of the present invention.

FIGS. 1 to 3 illustrate a diesel pump according to an embodiment. FIGS. 1 and 2 are sectional views and FIG. 3 is an external view. Each drawing illustrates a cross-section of a pump for easy understanding of the pump configuration. Accordingly, a cross-section may not be illustrated on a simple plane.

As illustrated in the drawings, a diesel pump 1 includes a pump housing 3, two cylinders 5 radially arranged at the pump housing 3, two plungers 7 reciprocably arranged at each of the two cylinders 5, and a drive mechanism 9 for driving the two plungers 7. The drive mechanism 9 is a rider mechanism and arranged between the two cylinders 5 at the center part of the pump housing 3.

As described above, the number of the cylinders 5 is two in the present embodiment. However, the present invention is not limited to this arrangement. It is also possible to arrange three or more cylinders.

The pump housing 3 is a component not to be exposed to high pressure fuel. Accordingly, the pump housing 3 may be made of highly productive material, easily available and machinable, such as aluminum alloy, cast iron and the like. In the present embodiment, the material of the pump housing is aluminum alloy. In summary, the pump housing 3 is constituted with a rider case portion 11 at the center and two cylinder hold portions 13 protruding to both sides from the rider case portion 11.

The inside of the rider case portion 11 is a rider room 15. A drive shaft 17 is axially supported in a rotatable manner at the rider room 15. The drive shaft 17 is rotated by rotational force of an engine, for example.

An offset shaft 19 (i.e., an offset journal) is integrated to the drive shaft 17. The offset shaft 19 is circular and the center of the offset shaft 19 is deviated from the rotation center of the drive shaft 17. Accordingly, when the drive shaft 17 is rotated, the center of the offset shaft 19 forms a circular locus as illustrated in the drawing.

A rider 21 is fitted to the outside of the offset shaft 19. A separate bearing is arranged between the rider 21 and the offset shaft 19. As illustrated in the drawing, the rider 21 has a flat face at both sides and contacts to the two plungers 7 at the flat faces thereof. Rotation of the rider 21 is restricted by the plungers 7. Accordingly, when the drive shaft 17 is rotated, the rider 21 is moved along the locus of the center of the offset shaft 19 while maintaining the posture of FIG. 1. As a result, the rider 21 reciprocates toward the plungers 7 at both sides while swinging in the perpendicular direction against the axial direction of the cylinders 5 (i.e., the plungers 7).

Figure 4:
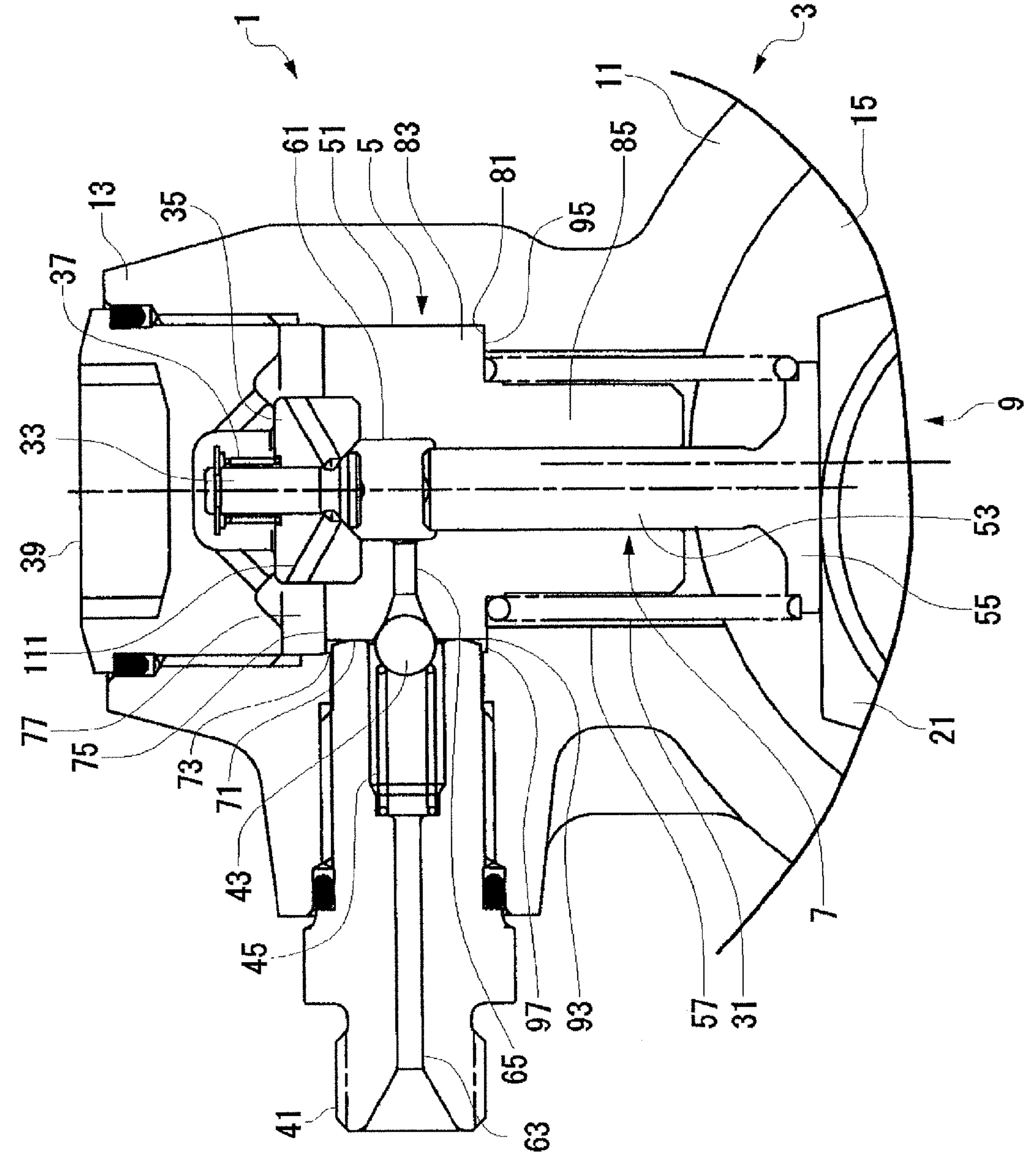
FIG. 4 is an enlarged view of a main part of FIG. 1.

Next, the configuration of the cylinder 5 and the circumferential portion thereof will be described with reference to FIG. 4. FIG. 4 is an enlarged view of a cylinder hold portion 13 of the pump housing 3.

In general, the cylinder 5 is held by the cylinder hold portion 13 and is provided with the plunger 7. The plunger 7 is driven toward the drive mechanism 9 (i.e., the rider 21) at the pump center by a plunger spring 31. An inlet valve 33 (i.e., an inlet port valve) and an inlet valve seat 35 are arranged at the outside in the axial direction against the cylinder 5. The inlet valve 33 is driven outward by the inlet valve spring 37 and contacts the inlet valve seat 35. A head plug 39 closes an opening of the pump housing 3 at the outside of the inlet valve 33. Further, an outlet joint 41 is attached to the cylinder 5 in the lateral direction. A sphere-shaped outlet valve 43 (i.e., an outlet port valve) and an outlet valve spring 45 are arranged at the outlet joint 41. In the following, details of the configuration of the above will be described.

As described above, the cylinder hold portion 13 is protruded from the rider case portion 11. A holding hole 51 being a penetrating hole extending to the rider room 15 from the top end part is arranged at the cylinder hold portion 13. More specifically, the holding hole 51 is a hole with a stepped portion and has a threaded hole formed at the inlet port side of the holding hole 51 to fasten the later-mentioned head plug 39. Here, the stepped portion of the holding hole 51 is called a housing step 95, as described later.

The cylinder 5 is made of special alloy steel called sulfur-less generally utilized for an ultrahigh pressure component. The special alloy steel is prepared by removing segregation-causing elements such as sulfur to the greatest possible extent. For an instrument used under ultrahigh pressure circumstances exceeding 1,800 bar (i.e., 180 MPa), for example, such special alloy steel is preferably utilized to ensure durability and reliability. As described above, such special alloy steel is called sulfur-less alloy steel in the specification and claims.

The cylinder 5 is a separate component from the pump housing and has a tubular shape. The cylinder 5 is slightly press-fitted into the holding hole 51 of the cylinder hold portion 13 so as to be held at the cylinder hold portion 13. Then, the entire cylinder 5 is placed inside the pump housing 3 as being attached to the pump housing 3.

The plunger 7 is inserted into the cylinder 5 and is reciprocable in the center axial direction of the cylinder 5. The plunger 7 includes a plunger shaft 53 and a plunger flange portion 55. The plunger shaft 53 is inserted into the cylinder 5 and the plunger flange portion 55 is contacting the flat portion of the rider 21 in the rider room 15. Further, a spring gap 57 is formed between the cylinder 5 and the pump housing 3 and a plunger spring 31 is arranged at the spring gap 57. The plunger spring 31 being a coil spring presses the plunger flange portion 55 and presses the plunger 7 against the rider 21.

The inlet valve seat 35 is placed in a concave portion at the top end side (i.e., the outer side in the axial direction) of the cylinder 5. The inlet valve 33 is inserted into the inlet valve seat 35. The inlet valve 33 is reciprocable along the center axis of the cylinder 5. The inlet valve 33 is a poppet valve that opens with negative pressure and functions to suck fuel into a pressurizing room 61 at the top end part of the cylinder 5. The inlet valve 33 is driven in the direction being apart from the cylinder 5, that is, outward in the axial direction, by the inlet valve spring 37 (i.e., the coil spring). The inlet valve spring 37 is attached by utilizing a washer and an E-shaped clip.

The head plug 39 is arranged at the outside of the inlet valve seat 35 and the inlet valve 33. The head plug 39 has an external thread at the outer circumference and is fastened to the holding hole 51 of the cylinder hold portion 13 of the pump housing 3. More specifically, a thread hole is formed at the upper part of the holding hole 51. The inner diameter of the thread hole is slightly larger than that of the holding hole 51 and the head plug 39 is fastened to the thread hole. Then, the head plug 39 holds the inlet valve seat 35 and closes the holding hole 51, so that the head plug 39 functions as a plug member of the present invention. A cylinder end space 77 is formed between the head plug 39 and an end face 75 of the cylinder 5. The cylinder end space 77 constitutes a part of a fuel supply route to the cylinder 5. An O-ring is arranged between the head plug 39 and the pump housing 3.

Further, as illustrated in FIG. 4, the outlet joint 41 (i.e., an outlet valve joint) is attached to the cylinder hold portion 13 of the pump housing 3. The outlet joint 41 is attached to a hole penetrating a protruding portion arranged at a side face of the cylinder hold portion 13. The outlet joint 41 is also made of sulfur-less alloy steel and is a tubular component to discharge pressurized fuel from the pressurizing room 61 of the cylinder 5.

The outlet joint 41 is arranged in the lateral direction, that is, in the direction perpendicular to the center axis of the cylinder 5. A passage 63 to discharge fuel is arranged along the center axis of the outlet joint 41. Meanwhile, a fuel discharge hole 65 is formed at the cylinder 5 in the lateral direction from the pressurizing room 61, that is, the direction being perpendicular to the center axis of the cylinder 5. The front end of the outlet joint 41 reaches the cylinder 5, so that the fuel discharge hole 65 and the passage 63 are connected. That is, a fuel discharge route is led directly from the cylinder 5 to the outlet joint 41 without passing through the pump housing 3. The fuel discharge route is connected from the outlet joint 41 to a common rail of a diesel engine.

The outlet valve 43 is arranged at the passage 63 for fuel discharge of the outlet joint 41. The outlet valve 43 is a sphere-shaped valve closing the fuel discharge hole 65 of the cylinder 5 pressing against the cylinder 5 by the outlet valve spring 45 (i.e., a coil spring). When pressure in the pressurized room 61 is increased, the outlet valve 43 is opened and fuel is discharged.

An external thread is formed at the outer circumference of the outlet joint 41. The outlet joint 41 is fastened to the pump housing 3. The front end of the outlet joint 41 is pressed to the outer face of the cylinder 5 with a fastening load. Further, an O-ring is arranged between the outlet joint 41 and the pump housing 3.

Further, a gap 73 (i.e., a joint circumference gap) is formed at the outside (i.e., the circumference) of a contact portion 71 between the cylinder 5 and the front end of the outlet joint 41. In the example of the drawing, the gap 73 is formed with the outer face of the cylinder 5, the outlet joint 41 and the inner face of the holding hole 51 of the pump housing 3. The gap 73 is connected to the cylinder end space 77 of the end face 75 (i.e., the top end face in the axial direction) of the cylinder 5. The cylinder end space 77 is located between the end face 75 of the cylinder 5 and the head plug 39. Then, the cylinder end space 77 constitutes a part of the fuel supply route to the cylinder 5. Accordingly, in the present embodiment, the gap 73 at the circumference of the contact portion 71 between the cylinder 5 and the outlet joint 41 is connected to the cylinder end space 77 of the end face part of the cylinder 5 and is connected to the fuel supply route thereby.

Figure 5A:
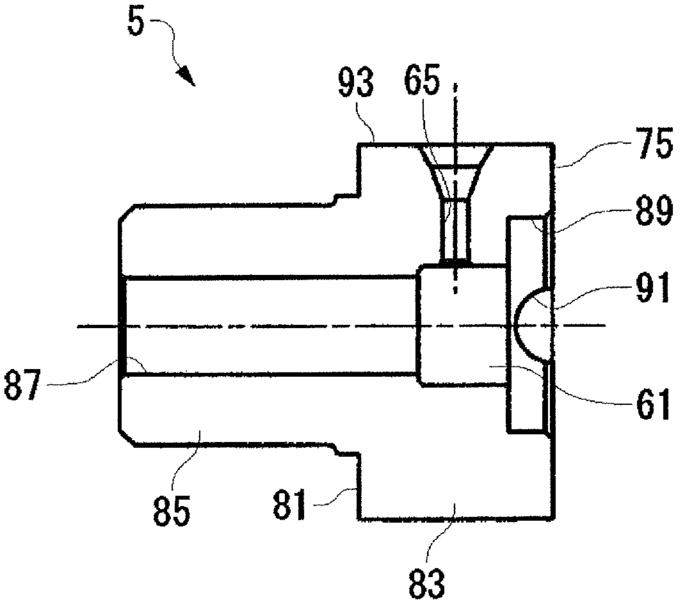
FIG. 5A is a view which separately illustrates a cylinder.
Figure 5B:
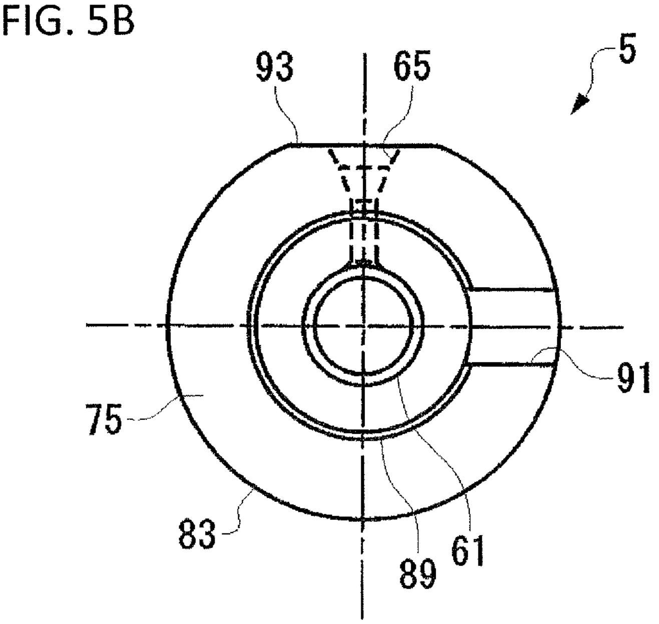
FIG. 5B is a view which separately illustrates the cylinder.

FIGS. 5A and 5B illustrate the cylinder 5 alone. The cylinder 5 and the related configuration thereto will be further described in detail with reference to the drawings.

As described above, the cylinder 5 is made of sulfur-less alloy steel and has an approximately tubular shape. A cylinder step 81 is formed at the outer circumference of the cylinder 5 in the direction intersecting the axial direction. A portion of the outer side in the axial direction from the cylinder step 81 is denoted as a first portion 83 (i.e., a press-fitting portion). A portion of the inner side in the axial direction from the cylinder step 81 is denoted as a second portion 85 (i.e., a spring hold portion). As described above, the outer side (i.e., the pump's outside) is the side being closer to the outer face of the pump and the inner side (i.e., the pump's inside) is the side being closer to the pump center (i.e., the side being farther from the outer face of the pump). The first portion 83 and the second portion 85 are integrated and the diameter of the second portion 85 is smaller than the diameter of the first portion 83.

A cylinder hole 87 is a penetrating hole along the center axis of the cylinder 5 and penetrates the entire cylinder 5 including the first portion 83 and the second portion 85. The plunger 7 slides within the cylinder hole 87. The pressurizing room 61 is formed at the top end part of the cylinder hole 87. The top end of the cylinder 5 is an end part in the axial direction located at opposite side to the rider 21 being the drive mechanism. When the plunger 7 reciprocates within the cylinder hole 87, fuel is charged into the pressurizing room 61 and is pressurized subsequently.

A valve seat storage portion 89 is arranged at the end face 75 (i.e., the top end face) of the cylinder 5. The valve seat storage portion 89 is a circular concave portion and the inlet valve seat 35 is attached thereto as described above. Further, a groove portion 91 is arranged at the end face 75 of the cylinder 5. The groove portion 91 extends in the radial direction of the cylinder 5 and constitutes a part of the fuel supply route to the cylinder 5.

Further, as described above, the fuel discharge hole 65 is arranged at the pressurizing room 61 of the cylinder 5. The fuel discharge hole 65 extends from the center axis of the cylinder 5 to be perpendicular thereto. The outlet port of the fuel discharge hole 65 is arranged at a flat joint contact area 93 of the outer face of the cylinder 5. That is, the joint contact area 93 is arranged at the outer face at a position corresponding to the outlet joint 41. The first portion 83 has a circular cross-section having a part thereof removed with a flat face, and the removed portion corresponds to the joint contact area 93.

The detailed configuration of the above cylinder 5 and the relation with the circumferential components will be further described with reference to FIGS. 5A and 5B along with FIG. 4 which is described above. As described above, the cylinder 5 includes the first portion 83 and the second portion 85. Then, the first portion 83 is press-fitted into the holding hole 51 of the pump housing 3 and intimately contacted thereto. A housing step 95 is formed at the holding hole 51 so as to be engaged with the cylinder step 81. The cylinder 5 is press-fitted until the cylinder step 81 contacts the housing step 95. Further, a flat face at the front end of the outlet joint 41 is contacting the joint contact area 93 of the first portion 83 of the cylinder 5. Consequently, the front end of the outlet joint 41 is intimately contacting the cylinder 5. The holding hole 51 is circular and the joint contact area 93 is flat. Accordingly, the gap 73 is formed at the circumference of the front end of the outlet joint 41. The gap 73 is formed at the circumference of the contact portion 71 where cylinder 5 and the outlet joint 41 meet and is located between the inner face of the holding hole 51 and the joint contact area 93. Since the joint contact area 93 reaches the end part in the axial direction (i.e., the end part of the top end side) of the cylinder 5, the gap 73 is connected to the cylinder end space 77. As described above, the cylinder end space 77 is a space between the end face 75 of the cylinder 5 and the head plug 39 (i.e., an example of the plug member of the present invention) and constitutes the fuel supply route.

Further, the housing step 95 constitutes a wall face 97 of the gap 73 at the inside (i.e., the side being closer to the pump center). That is, the housing step 95 defines the end in the cylinder axial direction (i.e., the end in the inner direction) of the gap 73. Accordingly, in the present embodiment, the contact structure of the cylinder step 81 and the housing step 95 performs positioning of the cylinder 5 in the axial direction and defines the end of the gap 73 in the cylinder axial direction. With the simple structure, cylinder positioning can be performed and appropriate gap can be formed at the outlet joint circumference.

Further, a tubular spring gap 57 is formed between the second portion 85 of the cylinder 5 and the holding hole 51. The plunger spring 31 is arranged at the spring gap 57. One end face of the plunger spring 31 is supported by the cylinder step 81 and the other end face of the plunger spring 31 drives the plunger 7 inward. In this manner, in the present embodiment, a structure to support the plunger spring 31 can be provided as well by utilizing the contact structure of the cylinder step 81 and the housing step 95. Accordingly, positioning of the cylinder 5, forming the gap 73 at the outlet joint circumference and the support structure of the plunger spring 31 can be achieved with the simple structure.

Next, setting of appropriate size of the cylinder 5 will be described. The cylinder 5 made of sulfur-less alloy steel is poor in machinability and is expensive. In view of productivity and cost, it is preferable that the cylinder 5 is small. Accordingly, the diameter of the cylinder 5 is set to be appropriately small within a range where necessary stiffness to support the plunger 7 can be obtained. Further, the range in the axial direction of the cylinder 5 is to be set as follows.

As illustrated in FIG. 4, in the present embodiment, the cylinder 5 is arranged in the range corresponding to the plunger shaft 53 when the plunger shaft 53 pressurizes fuel as the plunger flange portion 55 is pressed by the drive mechanism 9. In other words, the cylinder 5 is arranged in the range corresponding to the plunger shaft 53 when the plunger 7 positions at the top dead point.

Further, the cylinder 5 is arranged at the outer side from the plunger flange portion 55 in the axial direction when the plunger shaft 53 pressurizes fuel (i.e., when the plunger 7 positions at the top dead point). Further, the cylinder 5 is preferably arranged in the range where the outside end in the axial direction does not exceed the inlet valve 33. More preferably, the cylinder 5 is arranged in the range not to exceed the inlet valve seat 35 as illustrated in the drawing. In the example of FIG. 4, the outside end in the axial direction of the cylinder 5 is located at some midpoint of the inlet valve seat 35.

Next, a fuel route of the diesel pump 1 will be described. Fuel having pressure of 5 to 6 bar (i.e., 0.5 to 0.6 MPa) is supplied to the diesel pump 1. The fuel supply route is led to the cylinder end space 77 passing through passages 101, 103, 105, 107, and 109. The cylinder end space 77 is located at the top end part of the cylinder 5. More specifically, the cylinder end space 77 is a space formed by the cylinder 5, the head plug 39 at the outside, and the pump housing 3 at the circumference. The groove 91 of the end face 75 of the cylinder 5 faces the passage 109 and provides an opening of the passage 109 to the cylinder end space 77. Further, the fuel supply route is led to the pressurizing room 61 of the cylinder 5 passing through a passage 111 in the inlet valve seat 35. The passage 111 is opened and closed by the inlet valve 33.

Figure 6:
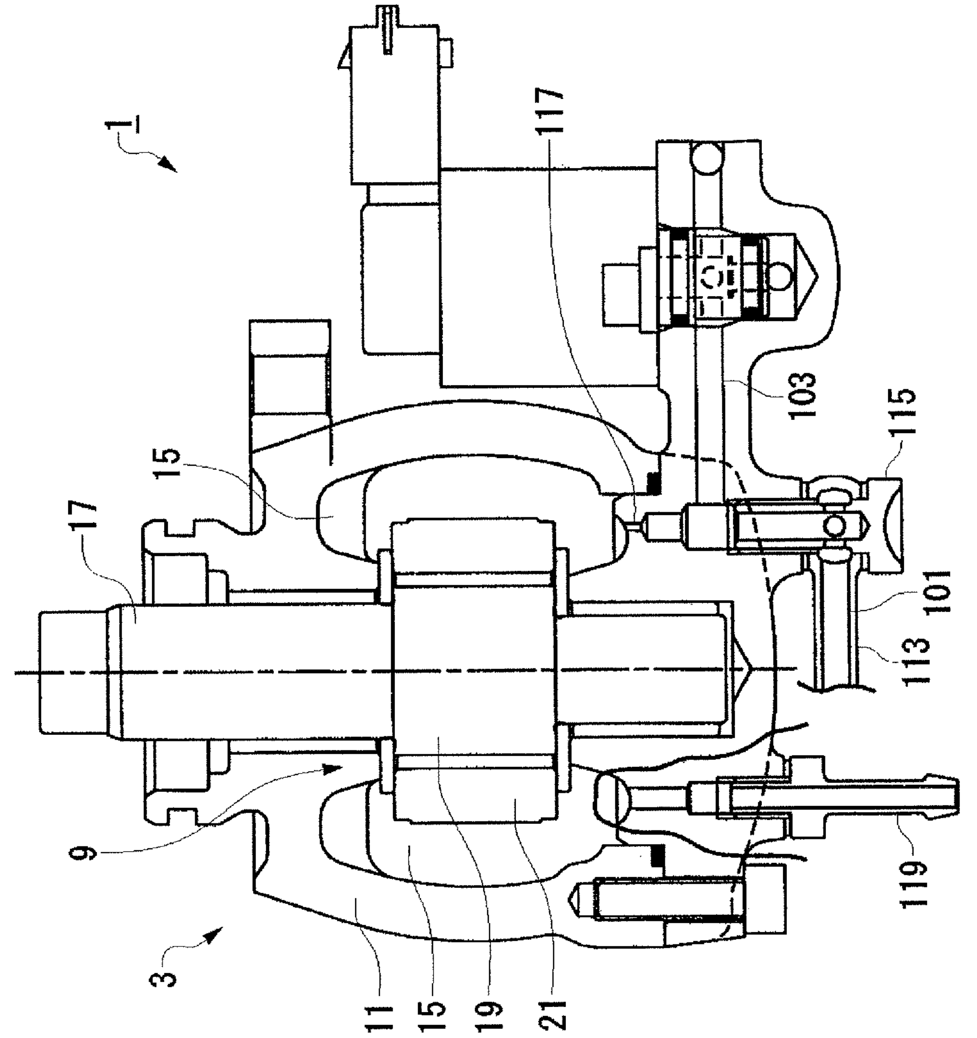
FIG. 6 is a view which illustrates a fuel supply route.

FIG. 6 is a sectional view of the diesel pump 1 sectioned along the fuel supply route. As illustrated in the drawing, the passage 101 is formed by a fuel connector 113 being a tubular component. Then, the fuel connector 113 (i.e., the passage 101) is connected to the passage 103 via a fuel bolt 115. More specifically, fuel reaches the passage 103 from the passage 101 passing through a passage in the fuel bolt 115.

Further, an orifice 117 is arranged at a bottom part of an attaching hole of the fuel bolt 115. The orifice 117 connects the fuel supply route to the rider room 15. Fuel is supplied to the rider room 15 via the orifice 117, so that the drive mechanism 9 (i.e., the rider mechanism) is lubricated with fuel. Further, a fuel return joint 119 is arranged to discharge fuel from the rider room 15 so as to perform circulation.

Meanwhile, the fuel discharge route being as described above is led to a common rail of a diesel engine from the fuel discharge hole 65 passing through the passage 63 for fuel discharge of the outlet joint 41. The fuel discharge hole 65 and the passage 63 are directly connected not via the pump housing 3. Further, as described above, in the present embodiment, the gap 73 at the circumference of the contact portion 71 of the cylinder 5 and the outlet joint 41 is connected to the fuel supply route at the cylinder end space 77 arranged at the end part of the cylinder 5.

In the above, the configuration of the diesel pump 1 according to the present embodiment is described. Next, a method of manufacturing the diesel pump 1 will be described. Here, a method of assembling the diesel pump 1 will be mainly described.

First, the pump housing 3 is prepared. The pump housing 3 includes a rider case portion 11 (i.e., a drive mechanism accommodating portion) and the pump hold portion 13. The cylinder 5 is attached from the external to the holding hole 51 of the pump hold portion 13. Here, the first portion 83 of the cylinder 5 is press-fitted. The cylinder 5 is press-fitted until the cylinder step 81 contacts the housing step 95, and thereby positioning of the cylinder 5 is performed.

Next, the inlet valve 33, the inlet valve seat 35 and the inlet valve spring 37 are attached to the outside in the axial direction of the cylinder 5, and then, the holding hole 51 is closed by the head plug 39. The lower face of the head plug 39 is located at a position being apart from the cylinder 5, so that the cylinder end space 77 being a part of the fuel supply route is formed among the end face 75 in the axial direction of the cylinder 5, the lower face of the head plug 39 and the inner face of the holding hole 51.

Further, the outlet joint 41 is attached to the cylinder hold portion 13. The outlet joint 41 is attached to the pump housing 3 so that the front end of the outlet joint 41 reaches the cylinder 5. Accordingly, the fuel discharge route is directly connected from the cylinder 5 to the outlet joint 41 not via the pump housing 3. Here, positioning is performed at the time of press-fitting of the cylinder 5 so that the passage 63 of the outlet joint 41 and the fuel discharge hole 65 from the cylinder 5 are connected.

The outlet joint 41 is attached to the housing hold portion 13 together with the outlet valve 43 and the outlet valve spring 45, so that the outlet valve 43 is driven toward the cylinder 5.

The outlet joint 41 is fastened to the cylinder hold portion 13 and the front end of the outlet joint 41 is pressed to the flat cylinder contact area 95 with the fastening load. The gap 73 is formed at the circumference of the front end of the outlet joint 41. As described above, the gap 73 is formed at the circumference of the contact portion 71 of the cylinder 5 and the outlet joint 41 between the inner face of the holding hole 51 and the outer face of the cylinder 5. Then, the gap 73 is connected to the cylinder end space 77. Here, the end (i.e., the wall face 97) of the inside of the gap 73 is formed by the housing step 95.

Meanwhile, the plunger spring 31 and the plunger 7 are inserted from the lower end side of the cylinder 5. The plunger spring 31 is inserted into the plunger gap 57 formed between the second portion 85 of the cylinder 5 and the holding hole 51. Further, the plunger 7 is reciprocably inserted into the cylinder hole 87 at the center of the cylinder 5. The plunger spring 31 is sandwiched by the cylinder step 81 and the plunger flange 55. Then, the plunger spring 31, supported by the cylinder step 81, restores the plunger 7. Further, the drive shaft 17 and the rider 21 being the drive mechanism 9 are assembled between the plungers 7 at both sides.

Next, operation of the diesel pump 1 will be described. When the drive shaft 17 of the drive mechanism 9 is rotated, the rider 21 is vertically moved and the plunger 7 is reciprocated. More specifically, the offset shaft 19 of the drive shaft 17 is rotated, so that the center of the offset shaft 19 forms a circular locus. Due to the rotation of the offset shaft 19, the rider 21 is reciprocated and the flat face of the rider 21 periodically presses the plunger 7. The plunger 7 is reciprocated by the pressing force of the rider 21 and the restoring force of the plunger spring 31.

By the way, the center of the plunger 7 (i.e., the center of the cylinder 5) is deviated from the center of the drive shaft 17. This arrangement is made to have the center of the plunger 7 and the center of the rider (i.e., the offset shaft center) be closer in a fuel pressurizing process of the plunger 7. With the offset, the inclination of the plunger 7 can be reduced.

Returning to the description of the operation of the diesel pump 1, the plunger 7 of the upper side is located at the top dead point as being pressed by the rider 21 in FIGS. 1 and 2. When the rider 21 is rotated, the flat face of the rider 21 lowers and the plunger 7 follows the rider 21 by the restoring force of the plunger spring 31. Due to the lowering of the plunger 7, negative pressure is generated at the pressurizing room 61 and the inlet valve 33 is opened as being lowered. Then, fuel is charged from the cylinder end space 77 into the pressurizing room 61 of the cylinder 5 passing through the inlet valve seat 35.

The plunger 7 of the lower side is located at the bottom dead point in FIGS. 1 and 2. The plunger 7 is also located at the bottom dead point in FIG. 4. The plunger 7 is driven towards the pressurizing room 61 after passing through the bottom dead point. When the plunger 7 is driven, the inlet valve 33 is closed and the fuel in the pressurizing room 61 is pressurized by the plunger 7. When the plunger 7 is driven and the pressure in the pressurizing room 61 overcomes the restoring force of the outlet valve spring 45, the outlet valve 43 is opened. The pressurized fuel is discharged to the common rail of the diesel engine passing through the passage 63 of the outlet joint 41.

With the above operation, high pressure is repeatedly exerted to the pressurizing room 61. However, in the present embodiment, since the cylinder 5 is made of sulfur-less alloy steel, segregation of sulfur is not likely to appear at the inner face of the cylinder 5 and a crack source is likely not to exist. Accordingly, high durability and reliability can be obtained. Even with pressure of 2,000 bar (i.e., 200 MPa), durability and reliability can be ensured.

Here, in the above operation, it is assumed that fuel is leaked from the contact portion 71 of the cylinder 5 and the front end of the outlet joint 41. The leaked fuel is returned to the cylinder end space 77 passing through the gap 73 at the circumference of the contact portion 71. Therefore, despite the fact that the pump adopts simple structure of contacting the outlet joint 41 to the cylinder 5 with fastening, fuel leakage to the outside of the pump can be prevented.

In the above, an embodiment of the present invention is described. In the present embodiment, the cylinder 5 is a separate component from the pump housing 3 and is attached to the pump housing 3. Accordingly, the size of the cylinder 5 can be decreased. Since the cylinder 5 is small, material having high reliability can be easily adopted. More specifically, even though the sulfurless alloy is adopted, it is possible to prevent serious decrease in productivity and serious increase in cost because the cylinder 5 is small in size, and has little spots to be machined. In this manner, it is possible to provide the diesel pump 1 which can enhance durability in a high pressure environment with high productivity and low cost.

Further, in the present embodiment, the cylinder 5 may be made of sulfur-less alloy steel. The sulfur-less alloy steel has high reliability but is expensive and poor in machinability. Even when such material is adopted, serious decrease in productivity and serious increase in cost can be prevented since the cylinder 5 is small. Accordingly, it is possible to provide the diesel pump of which durability in a high pressure environment can be enhanced with high productivity and low cost.

Further, in the present embodiment, the cylinder 5 may be a tubular component and may be press-fitted to the pump housing 3. Accordingly, the cylinder 5 can be appropriately arranged at the pump housing 3.

Further, in the present embodiment, the plural cylinders 5 may be radially arranged having the driving mechanism 9 at the center. The plural plungers 7 are arranged at each of the plural cylinders 5, and fuel may be pressurized as the drive mechanism 9 drives the plural plungers 7 in the outer direction of the pump housing 3. The configuration corresponds to a diesel pump of an outer-plunger type. With the diesel pump of the outer-plunger type, fuel pressure is set to be high. In the present embodiment, high reliability can be provided even against such high pressure.

Further, in the present embodiment, the plunger 7 may include the plunger shaft 53 inserted into the cylinder 5 and the plunger flange portion 55 pressed to the drive mechanism 9. The cylinder 5 may be arranged in a range corresponding to the plunger shaft 53 when the plunger shaft 53 pressurizes fuel as the plunger flange portion 55 is pressed by the drive mechanism 9. The cylinder 5 may be arranged in a range corresponding to the plunger shaft 53 when the plunger 7 is located at the top dead point. In this manner, the cylinder 5 can be preferably lessened in size by arranging the cylinder 5 at a limited range.

Further, in the present embodiment, the inlet valve 33 may be arranged at the end part of the cylinder 5. The cylinder 5 may be arranged in a range not exceeding the inlet valve 33 in the axial direction. More preferably, the cylinder 5 may be arranged in the range not exceeding the inlet valve seat 35 in the axial direction, and the end part of the cylinder 5 may be located at some midpoint of the inlet valve seat 35 in the axial direction. Further, the cylinder 5 may be arranged at the outer side from the plunger flange portion 55 when the plunger shaft 53 pressurizes fuel in the cylinder 5 as the drive mechanism 9 presses the plunger flange portion 55. In this manner, the volume of cylinder 5 can be preferably decreased by arranging the cylinder 5 at a limited range.

Further, in the present embodiment, the outlet joint 41 may be attached to the pump housing 3 and fuel may be discharged from the cylinder 5. The front end of the outlet joint 41 may reach the cylinder 5 and the fuel discharge route may be directly led from the cylinder 5 to the outlet joint 41 not via the pump housing 3. With this configuration, durability of the fuel discharge route from the cylinder 5 can be preferably ensured.

Further, in the present embodiment, the outlet joint 41 may have the thread portion at the outer circumference and the outlet joint 41 may be fastened to the pump housing 3. The front end of the outlet joint 41 may be pressed to the cylinder with the fastening load. In this manner, by pressing the outlet joint 41 to the cylinder 5 with the fastening load, the cylinder 5 and the outlet joint 41 can be reliably coupled with the simple structure and reliability can be enhanced.

Further, in the present embodiment, the cylinder 5 may include the joint contact area 93 at the outer circumference. The joint contact area 93 may be flat and the front end of the outlet joint 41 may be contacted with the joint contact area 93 of the cylinder 5. The joint contact area 93 is appropriately arranged at the position corresponding to the outlet joint 41. In this manner, by contacting the front end of the outlet joint 41 to the flat joint contact area 93, the cylinder 5 and the outlet joint 41 can be reliably coupled with the simple structure and reliability can be enhanced.

Further, in the present embodiment, the fuel supply route to the cylinder 5 may be arranged so as to guide fuel to the cylinder 5 passing through the cylinder end space 77 located at the end face part in the axial direction of the cylinder 5. It is possible to arrange the structure where the fuel leaked from the contact portion 71 of the cylinder 5 and the front end of the outlet joint 41 is returned to the cylinder end space 77 passing between the pump housing 3 and the cylinder 5. The edge part of the contact portion 71 is appropriately connected to the cylinder end space 77 directly or indirectly. With such structure, even if fuel is leaked from the contact portion 71 of the cylinder 5 and the outlet joint 41, the leaked fuel is returned to the cylinder 5. Accordingly, reliability can be enhanced.

As described above, fuel pressure of a diesel pump is about to reach 2,000 bar (i.e., 200 MPa). It is possible that even higher fuel pressure is required in the future. The above fuel reflux configuration is considered to be particularly effective to ensure reliability for such a high pressure diesel pump.

Further, in the present embodiment, the cylinder 5 may be press-fitted to the holding hole 51 formed at the pump housing 3. The holding hole 51 may be plugged with the plug member at a position being apart from the end face 75 in the axial direction of the cylinder 5. The cylinder end space 77 may be formed among the end face in the axial direction of the cylinder 5, the inner face of the holding hole 51 and the plug member. The cylinder end space 77 may constitute a part of the fuel supply route to the cylinder 5. The cylinder 5 may include the joint contact area 93 at the outer circumference. The front end of the outlet joint 41 may be located at the joint contact area 93 of the cylinder 5. The gap 73 may be formed between the inner face of the holding hole 51 and the joint contact area 93 at the circumference of the contact portion of the cylinder 5 and the outlet joint 41. The gap 73 may be connected to the cylinder end space 77. Preferably, the holding hole 51 is circular at least at the press-fitting part and the joint contact area 93 is flat.

In this manner, in the present embodiment, the gap 73 at the circumference of the front end of the outlet joint 41 is connected to the fuel supply route at the end face part of the cylinder 5. Accordingly, even if fuel is leaked from the contact portion 71 of the cylinder 5 and the outlet joint 41, the leaked fuel is returned to the cylinder 5. Accordingly, reliability can be enhanced. In addition, the connection between the gap 73 and the fuel supply route is achieved with the simple structure utilizing the circular holding hole 51 and the joint contact area 93 of the cylinder 5. Therefore, reliability can be enhanced with the simple structure.

Further, in the present embodiment, the cylinder step 81 may be formed at the cylinder 5 in the direction intersecting the axial direction. The housing step 95 may be formed at the holding hole 51 of the pump housing 3 so as to be engaged with the cylinder step 81. The cylinder step 81 may contact the housing step 95 as the cylinder is press-fitted to the holding hole 51 from the outside. The end in the cylinder axial direction of the gap 73 may be defined by the housing step 95 while positioning of the cylinder 5 in the axial direction is performed with the contact. In this manner, the end in the cylinder axial direction of the gap 73 at the circumference of the outlet joint 41 is defined while positioning of the cylinder 5 is performed in the axial direction by utilizing the contact structure of the cylinder step 81 and the housing step 95. Accordingly, positioning of the cylinder 5 can be performed and the gap at the circumference of the outlet joint 41 can be formed with the simple structure.

Further, in the present embodiment, the cylinder 5 may include the first portion 83 of the outer side in the axial direction from the cylinder step 81 and the second portion 85 of the inner side in the axial direction from the cylinder step 81. The first portion 83 and the second portion 85 may be integrated. The first portion 83 may be press-fitted to the holding hole 51. The diameter of the second portion 85 may be smaller than the diameter of the first portion 83. The spring gap 57 may be formed at the second portion 85 and the holding hole 51. The plunger spring 31 may be arranged at the spring gap 57 and may drive the plunger 7 inward as being supported by the cylinder step 81. In this manner, in the present embodiment, the structure to support the plunger spring 31 can be provided as well by utilizing the striking structure of the cylinder step 81 and the housing step 95. Accordingly, positioning of the cylinder 5, forming of the gap at the circumference of the outlet joint 41 and support structure of the plunger spring 7 can be achieved with the simple structure.

[Cylinder Having Divided Structure]

Next, a modified example of the above embodiment will be described with reference to FIGS. 7, 8A and 8B. In the above embodiment, the cylinder has the integrate structure. Meanwhile, in the embodiment described in the following, the cylinder has a divided structure. In the following, description on items being common to the above embodiment will not be repeated and differences from the above embodiment will be described.

Figure 7:
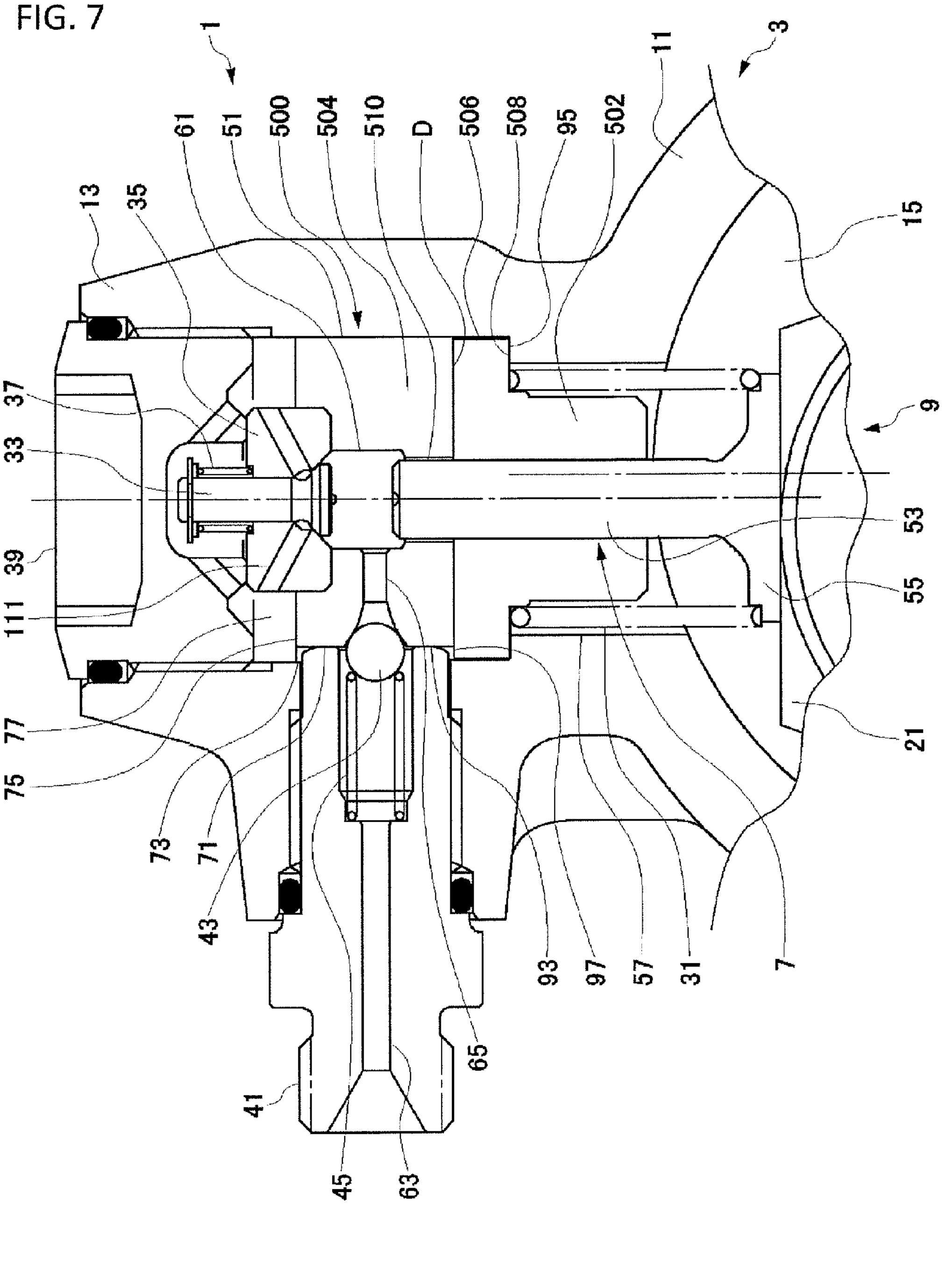
FIG. 7 is a sectional view of a main part of a diesel pump in a case where a cylinder has a divided structure.
Figure 8A:
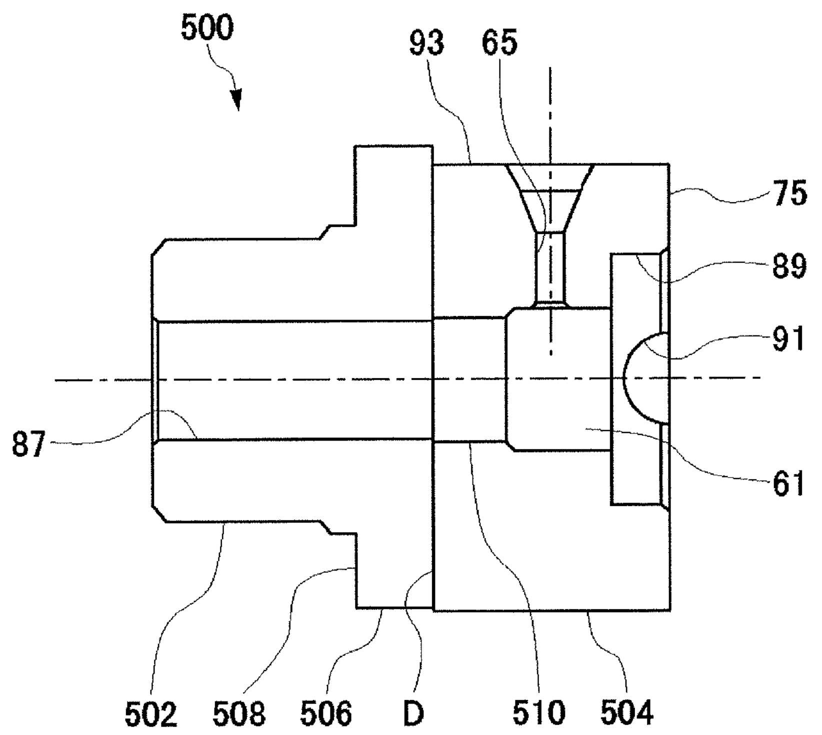
FIG. 8A is a view which illustrates the cylinder having the divided structure.
Figure 8B:
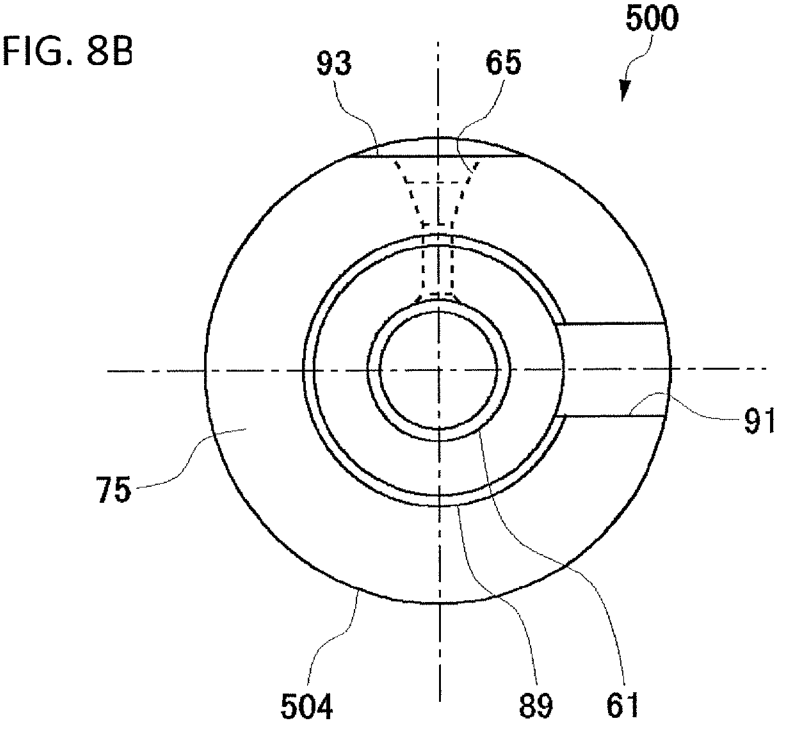
FIG. 8B is a view which illustrates the cylinder having the divided structure.

As illustrated in FIGS. 7 and 8A, in the present embodiment, the diesel pump 1 includes a cylinder 500 instead of the abovementioned cylinder 5. The cylinder 500 having a divided structure is divided into a slide portion 502 and an inlet/outlet portion 504 at a division face D. Both the slide portion 502 and the inlet/outlet portion 504 are made of sulfur-less alloy steel.

The slide portion 502 is a portion at the inner side (i.e., the side being closer to the center) than the division face D along the axial direction of the cylinder 500 and corresponds to the second portion 85 of the cylinder 5 illustrated in FIG. 5A. Accordingly, the slide portion 502 includes the cylinder hole 87 and the plunger 7 slides within the cylinder hole 87, so that the cylinder function is provided thereby. Further, the outer diameter of the slide portion 502 is smaller than the outer diameter of the inlet/outlet portion 504. The spring gap 57 is formed between the slide portion 502 and the holding hole 51 of the pump housing 3. However, different from the second portion 85 of FIG. 5A, the slide portion 502 includes a circular flange 506 at the end part (i.e., the end part of the outside in the axial direction) of the side of the inlet/outlet portion 504.

The inlet/outlet portion 504 is a portion at the outer side (i.e., the side being closer to the outer face of the pump) than the division face D along the axial direction of the cylinder 500 and corresponds to the first portion 83 of the cylinder 5 illustrated in FIG. 5A. The inlet/outlet portion 504 being structured approximately equally to the first portion 83 of the cylinder 5 includes the pressurizing room 61, the fuel discharge hole 65, the valve seat storage portion 89 and the like. The joint contact area 93 being a flat face is arranged at the inlet/outlet portion 54 as well. With this structure, the inlet/outlet portion 504 provides functions of charging and discharging of fuel.

In the above embodiment of FIGS. 4 and 5A, the cylinder 5 includes the cylinder step 81. The cylinder step 81 is engaged with the housing step 95 at the holding hole 51 of the pump housing 3 and supports the plunger spring 31. Meanwhile, in the present embodiment, the flange 506 of the slide portion 502 includes a step 508. The step 508 is a flange end face at the opposite side to the face contacting the inlet/outlet portion 504, and the step 508 corresponds to the cylinder step. Accordingly, in the present embodiment, the flange 506 (i.e., the step 508) is engaged with the housing step 95. Further, the flange 506 supports the plunger spring 31 arranged at the spring gap 57 formed between the slide portion 502 and the holding hole 51. Then, the plunger spring 31 presses the plunger 7.

In accordance with arrangement of the above flange 506, the shape of the holding hole 51 of the pump housing 3 is changed. Specifically, the position of the housing step 95 is moved toward the side being closer to the center of the pump housing 3 by the thickness of the flange 506. Further, entire length of the plunger spring 31 is also changed to be shorter corresponding to the thickness of the flange 506.

Further, in the above structure, the outer diameter of the inlet-outlet portion 504 is similar to the outer diameter of the first portion 83 of the cylinder 5. Accordingly, the inlet/outlet portion 504 is press-fitted to the holding hole 51 of the pump housing 3. Meanwhile, the outer diameter of the flange 506 of the slide portion 502 is set to be slightly smaller than the inner diameter of the holding hole 51 to the extent of not causing press-fit. Accordingly, the slide portion 502 is not press-fitted to the holding hole 51.

When attaching the cylinder 500 to the pump housing 3, the slide portion 502 is inserted into the holding hole 51 from the outside and the inlet/outlet portion 504 is press-fitted to the holding hole 51 from the outside subsequently. The flange 506 of the slide portion 502 contacts the housing step 95 of the pump housing 3, so that positioning of the cylinder 500 (i.e., the slide portion 502 and the inlet/outlet portion 504) in the axial direction is performed thereby. Further, the flange 506 is sandwiched by the inlet/outlet portion 504 and the housing step 95, so that the slide portion 502 is fixed.

In the present embodiment, the flange 506 of the slide portion 502 provides plural functions as follows.

The first function is to prevent falling of the slide portion 502. In the present embodiment, the divided structure is adopted. The slide portion 502 is a small-diameter portion and the slide portion 502 is pressed by the inlet/outlet portion 504. To prevent the slide portion 502 from falling to the rider room 15, the flange 506 contacts the housing step 95.

The second function is to perform positioning in the lateral direction. As described above, the diameter of the flange 506 is slightly smaller than the holding hole 51. Accordingly, the position of the slide portion 502 in the lateral direction is determined by the flange 506.

The third function is to support the plunger spring 31, as described above. In the above embodiment, the cylinder step 81 of the cylinder 5 supports the plunger spring 31. In the present embodiment, the step 508 of the flange 506 supports the plunger spring 31 as the cylinder step.

The fourth function is to form the wall face of the gap 73. As described above, the gap 73 is formed between the contact area 93 of the cylinder 500 and the pump housing 3 and functions to return the fuel leaked from the contact portion of the outlet joint 41 and the cylinder 500 to the fuel supply route. In the above embodiment, the housing step 95 forms the wall face of the end in the cylinder shaft direction of the gap 73. In the present embodiment, the slide portion 502 includes a flange 506 and the flange 506 forms the wall face of the end in the cylinder shaft direction of the gap 73.

Further, in the present embodiment, the inlet/outlet portion 504 has a penetrating hole 510 at the center. The inner diameter of the penetrating hole 510 is set to be larger than the inner diameter of the cylinder hole 87 of the slide portion 502. The diameter of the penetrating hole 510 is set so that a gap is surely formed between the penetrating hole 510 and the plunger 7. More specifically, the diameter of the penetrating hole 510 is set so that the penetrating hole 510 does not directly contact the plunger 7, considering dimensional tolerance of each component and positional tolerance the slide portion 502. For example, the gap between the penetrating hole 510 and the plunger 7 is approximate 0.1 mm. With such structure, the inlet/outlet portion 504 performs only the charging/discharging function and only the slide portion 502 provides the slide function (i.e., the cylinder function). Accordingly, damage and the like caused by the contact between the inlet/outlet portion 504 and the plunger 7 can be prevented.

In the above, another embodiment of the present invention is described with reference to FIGS. 7, 8A and 8B. According to the present embodiment, the cylinder 500 has the divided structure constituted with the slide portion 502 and the inlet/outlet portion 504. With such structure, machining of the cylinder 500 becomes easy and productivity can be enhanced.

In the above, preferred embodiments of the present invention which can be presently considered are described. It is understood that a variety of modifications to the present embodiments can be performed. It is intended that the attached claims include all of such modifications within the spirit and the scopes of the present invention.

INDUSTRIAL APPLICABILITY

As described above, the diesel pump according to the present invention is capable of enhancing durability in a high pressure environment with high productivity and low cost, and is useful, for example, as a high pressure diesel pump.

The invention claimed is:

1. A diesel pump comprising:

a pump housing;

a cylinder press-fitted to a holding hole formed at the pump housing;

a plunger reciprocably arranged at the cylinder; and a drive mechanism for driving the plunger;

wherein the cylinder is a separate component from the pump housing and is attached to the pump housing;

an inlet valve seat placed at the outer side in the axial direction of the cylinder;

a plug member fastened to the holding hole so as to hold the inlet valve seat and plug the holding hole;

an outlet joint attached to the pump housing to discharge fuel from the cylinder, wherein the front end of the outlet joint reaches the cylinder;

a fuel discharge route is directly led from the cylinder to the outlet joint not via the pump housing;

wherein a cylinder end space is formed among an end face in the axial direction of the cylinder, an inner face of the holding hole and the plug member;

the cylinder end space constitutes a part of a fuel supply route to the cylinder;

the cylinder includes a joint contact area at the outer circumference;

the front end of the outlet joint is located at the joint contact area of the cylinder;

a gap is formed at a contact portion of the cylinder and the outlet joint, the gap located between the inner face of the holding hole and the joint contact area;

the gap is connected to the cylinder end space.

2. The diesel pump according to claim 1, wherein the cylinder is made of sulfur-less alloy steel.

3. The diesel pump according to claim 1, wherein the cylinder is a tubular component.

4. The diesel pump according to claim 1, wherein plural cylinders are radially arranged having the drive mechanism at the center;

plural plungers are arranged at each of the cylinders; and the drive mechanism pressurizes fuel by driving the plungers in the outer direction of the pump housing.

5. The diesel pump according to claim 1, wherein the plunger includes a plunger shaft inserted into the cylinder and a plunger flange portion to be pressed by the drive mechanism; and the cylinder is arranged in a position corresponding to the plunger shaft when the plunger shaft pressurizes fuel as the plunger flange portion is pressed by the drive mechanism.

6. The diesel pump according to claim 5, wherein an inlet valve is arranged at an end part in the axial direction of the cylinder; and the cylinder is arranged in a position not to exceed the inlet valve in the axial direction.

7. The diesel pump according to claim 1, wherein the outlet joint includes a thread portion at an outer circumference and is fastened to the pump housing; and the front end of the outlet joint is pressed to the cylinder with a fastening load.

8. The diesel pump according to claim 1, wherein the joint contact area is flat.

9. The diesel pump according to claim 1, wherein a fuel supply route to the cylinder is arranged so as to guide fuel to the cylinder passing through the cylinder end face; and the diesel pump includes structure where fuel leaked from the contact portion of the cylinder and the front end of the outlet joint is returned to the cylinder end space passing between the pump housing and the cylinder.

10. The diesel pump according to claim 1, wherein a cylinder step in the direction intersecting the axial direction is formed at the cylinder;

a housing step is formed at the holding hole of the pump housing so as to be engaged with the cylinder step;

the cylinder step contacts the housing step as the cylinder is press-fitted to the holding hole from the outside; and the end in the cylinder axial direction of the gap is defined by the housing step while positioning of the cylinder in the axial direction is performed by the contact.

11. The diesel pump according to claim 10, wherein the cylinder includes a first portion at the outer side in the axial direction from the cylinder step and a second portion at the inner side in the axial direction from the cylinder step;

the first portion and the second portion are integrated;

the first portion is press-fitted to the holding hole;

the diameter of the second portion is smaller than the diameter of the first portion;

a spring gap is formed between the second portion and the holding hole; and a plunger spring is arranged at the spring gap and restores the plunger inward in the axial direction as being supported by the cylinder step.

12. The diesel pump according to claim 1, wherein the cylinder has divided structure constituted with a slide portion to provide a cylinder function with which the plunger slides at the inside, and an inlet/outlet portion to provide a fuel charging/discharging function having a pressurizing room and a fuel discharge hole.

13. A method for manufacturing a diesel pump comprising the processes of:

preparing a pump housing having a cylinder hold portion;

attaching a cylinder being separate from the pump housing to the cylinder hold portion;

reciprocably arranging a plunger to the cylinder; and attaching a drive mechanism for driving the plunger to the pump housing;

placing an inlet valve seat at the outer side in the axial direction of the cylinder;

fastening a plug member to the holding hole so as to hold the inlet valve seat and plug the holding hole;

attaching an outlet joint for discharging fuel from the cylinder to the pump housing so that the front end of the outlet joint reaches the cylinder;

leading a fuel discharge route from the cylinder directly to the outlet joint not via the pump housing;

wherein the process of attaching the cylinder includes press-fitting the cylinder to a holding hole formed at the pump housing;

further, forming a cylinder end space by an end face in the axial direction of the cylinder, an inner face of the holding hole, and the plug member; and constituting a part of a fuel supply route to the cylinder with the cylinder end space; and the process of attaching the outlet joint includes locating the front end of the outlet joint at a joint contact area arranged at the outer circumference of the cylinder;

forming a gap at a contact portion of the cylinder and the outlet joint, the gap located between the inner face of the holding hole and the joint contact area; and connecting the gap and the cylinder end space.

14. The method for manufacturing a diesel pump according to claim 13, wherein the cylinder is made of sulfur-less alloy steel.

15. The method for manufacturing a diesel pump according to claim 13, wherein the cylinder is tubular.

16. The method for manufacturing a diesel pump according to claim 13, wherein the process of attaching the outlet joint includes fastening the outlet joint to the pump housing by utilizing a thread portion at the outer circumference of the outlet joint, and pressing the front end of the outlet joint to the cylinder with a fastening load.

17. The method for manufacturing a diesel pump according to claim 13, wherein a cylinder step in the direction intersecting the axial direction is formed at the cylinder;

a housing step is formed at the holding hole of the pump housing so as to be engaged with the cylinder step; and the process of attaching the cylinder includes press-fitting the cylinder to the holding hole from the outside, contacting the housing step with the cylinder step, and forming the end in the cylinder axial direction of the gap with the housing step while performing positioning of the cylinder in the axial direction with the contact.

18. The method for manufacturing a diesel pump according to claim 17, wherein the cylinder includes a first portion at the outer side in the axial direction from the cylinder step and a second portion at the inner side in the axial direction from the cylinder step;

the first portion and the second portion are integrated;

the first portion is press-fitted to the holding hole;

the diameter of the second portion is smaller than the diameter of the first portion; and the process of attaching the cylinder includes forming a spring gap between the second portion and the holding hole by press-fitting the cylinder to the holding hole, further, arranging a plunger spring at the spring gap, supporting the plunger spring with the cylinder step, and restoring the plunger inward in the axial direction.

19. The method for manufacturing a diesel pump according to claim 13, wherein the cylinder has divided structure constituted with a slide portion to provide a cylinder function with which the plunger slides at the inside and an inlet/outlet portion to provide a fuel charging/discharging function having a pressurizing room and a fuel discharge hole; and the process of attaching the cylinder includes inserting the slide portion into a holding hole formed at the housing hold portion of the pump housing, and further, press-fitting the inlet/outlet portion to the holding hole.

20. A method for manufacturing a diesel pump comprising the processes of:

preparing a pump housing having a cylinder hold portion;

attaching a cylinder being separate from the pump housing to the cylinder hold portion;

reciprocably arranging a plunger to the cylinder; and attaching a drive mechanism for driving the plunger to the pump housing;

placing an inlet valve seat at the outer side in the axial direction of the cylinder;

fastening a plug member to the holding hole so as to hold the inlet valve seat and plug the holding hole;

attaching an outlet joint for discharging fuel from the cylinder to the pump housing so that the front end of the outlet joint reaches the cylinder;

leading a fuel discharge route from the cylinder directly to the outlet joint not via the pump housing;

wherein the cylinder has divided structure constituted with a slide portion to provide a cylinder function with which the plunger slides at the inside and an inlet/outlet portion to provide a fuel charging/discharging function having a pressurizing room and a fuel discharge hole; and the process of attaching the cylinder includes inserting the slide portion into a holding hole formed at the housing hold portion of the pump housing, and further, press-fitting the inlet/outlet portion to the holding hole.

* * * * *